US007634846B2

(12) United States Patent
Luangthep

(10) Patent No.: US 7,634,846 B2
(45) Date of Patent: Dec. 22, 2009

(54) PROCESS FOR PRODUCING A SURFACE FINISH SHEET

(75) Inventor: Thanpuying Supornpen Luangthep, Bangkok (TH)

(73) Assignee: The Foundation for the Promotion of Supplementary Occupations and Related Techniques of Her Majesty Queen Sirikit, Bangkok (TH)

( * ) Notice: Subject to any disclaimer, the term of this patent is extended or adjusted under 35 U.S.C. 154(b) by 733 days.

(21) Appl. No.: 10/862,895

(22) Filed: Jun. 7, 2004

(65) Prior Publication Data

US 2005/0123714 A1 Jun. 9, 2005

(30) Foreign Application Priority Data

Dec. 9, 2003 (TH) ..................................... 087251

(51) Int. Cl.
*B32B 9/04* (2006.01)

(52) U.S. Cl. ......................... 29/428; 428/105; 428/114; 428/473

(58) Field of Classification Search .................. 29/17.1, 29/17.2, 17.3, 17.4; 72/379.2; 428/98, 105, 428/114, 473
See application file for complete search history.

(56) References Cited

U.S. PATENT DOCUMENTS

| | | | | |
|---|---|---|---|---|
| 179,462 | A * | 7/1876 | O'Neill | 428/631 |
| 347,497 | A * | 8/1886 | Millot | 442/148 |
| 4,810,551 | A * | 3/1989 | Chu | 428/106 |
| 4,857,412 | A * | 8/1989 | Fleury | 428/577 |
| 5,359,872 | A * | 11/1994 | Nashiki | 72/16.1 |
| 6,119,423 | A * | 9/2000 | Costantino | 52/390 |
| 6,648,363 | B2 * | 11/2003 | Gordon | 280/610 |

FOREIGN PATENT DOCUMENTS

CN 2107497 U 6/1992

* cited by examiner

*Primary Examiner*—Jermie E Cozart
(74) *Attorney, Agent, or Firm*—Ladas & Parry LLP

(57) ABSTRACT

A process for producing a surface finish from natural materials, whereby the obtained surface finish may be in the form of any shape, and preferably is in the form of a thin sheet having a nature that has a relationship with the form of a product desired to be finished.

17 Claims, 1 Drawing Sheet

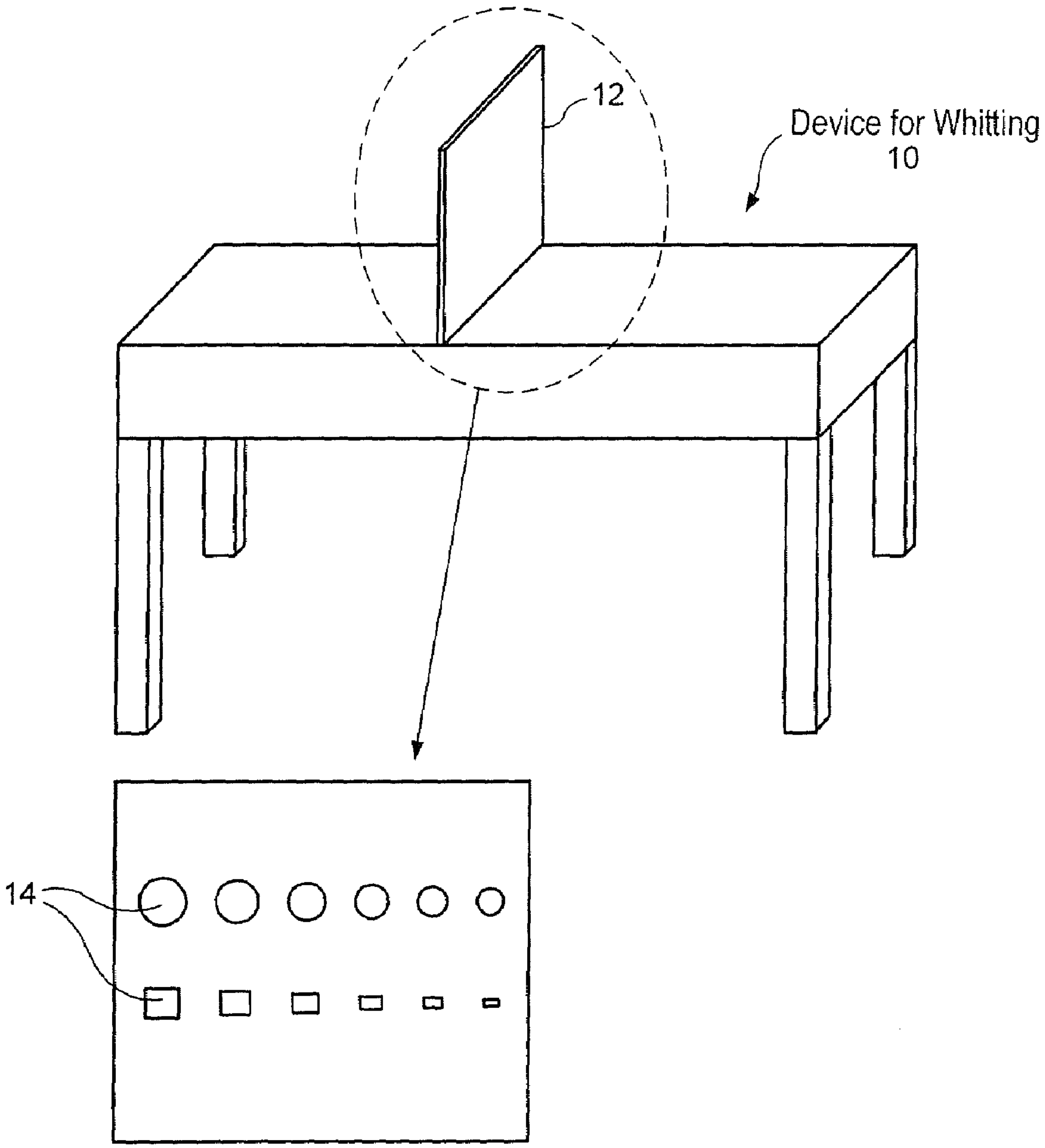
12
Device for Whitting
10
14

PROCESS FOR PRODUCING A SURFACE FINISH SHEET

BACKGROUND OF THE INVENTION

1. Field of the Invention

This invention relates to a process for producing a surface finish sheet from natural materials such as materials from plants by using the interlock friction of the natural materials in producing the surface finish sheet, without using any binder.

2. Description of the Related Art

There are many methods available for the production of a surface finish for covering the surfaces of any articles or implements such as a surface finish of a plastic or synthetic fiber nature or such as in the form of composite materials. However, either during the stage of production or during the stage of application, a binding chemical is required, and such may cause pollution.

Many natural materials have been used for this purpose. However, mostly, a framework of an implement must be produced first and, subsequently, the required natural material is used for binding the framework such as by winding or adhesion by any means, and the framework is usually made from rattan. At present, the use of rattan is discouraged.

SUMMARY OF THE INVENTION

This invention is directed to a process for producing a surface finish sheet from natural materials by using friction between the materials without using any sort of binder.

FIG. 1 illustrates a device for whittling.

DETAILED DESCRIPTION OF THE INVENTION

This invention is directed to a process for producing a surface finish from natural materials. The surface finish may be of any shape, and preferably is in the form of a thin sheet having a feature relating to the feature of a product that is desired to be finished.

The process of this invention comprises the stage of producing surface finish strips that should be made from natural materials such as materials from plants, for example, *Lygodium flexuosum* vine, bamboo, vetiver grass, etc., although other materials can be used such as metals. The process of this invention also comprises the stage of producing a surface finish sheet from the surface finish strips by using friction between the surface finish strips.

The stage of producing these surface finish strips essentially comprises the shaping of a natural material into a thin strip with a consistent size throughout its length. This may be carried out by various methods such as whittling or rolling. One method proposed as an embodiment in this invention is whittling. The natural material which has been selected as being suitable for use, namely, having a size and color as required and which may have been dyed with a desired color, is first subjected to whittling. The device 10 for whittling comprises a metal sheet device 12 which has several sized holes 14 which can downsize the natural material gradually. The material is first inserted to pass properly through a hole, sized to whittle the material, and then pass through a smaller hole, sized to further whittle the material, until a width and a thickness of the strip as required is obtained. A suitable width should be 0.5-5 mm and, more preferably, is 1-2 mm, whereas a suitable thickness should not be greater than 1 mm, although this thickness is not critical. The strips should be whittled to a suitable size as required and be even. It is optional to dye these strips after their desired size is obtained.

The stage of producing a surface finish sheet according to this invention is the fabricating and fixing of these strips to make a sheet with multicolored designs as required. The method of this invention can be accomplished by using friction between the surface finish warp strips and weft strips to enable them to adhere together. The proposed method of the invention may be carried out by fixing the warp strips longitudinally to a plate of suitable size, which should be larger than an area to be covered with the produced surface finish sheet, without having predetermined specific values and just depending upon a desire and the method of fabricating and fixing of the produced surface finish sheet to the surface of a desired material or equipment. The fabricating and fixing of each surface finish strip may be chosen to be adjacent to one another or interspaced as appropriate. In this regard, it may be optional to alternate the colors to create any designs as required.

As an embodiment of the invention, it is optional to insert surface finish weft strips under or over the surface finish warp strips and therefore the surface finish weft strip which has been inserted under or over will be parallel to the width of the plate. It may be optional to insert the surface finish weft strips under and over the surface finish warp strips in an alternate order, in a proportion of 1/1, or in another proportion.

As another embodiment of the invention, it may be optional to insert surface finish weft strips in a diagonal direction to surface finish warp strips by selecting a method of inserting surface finish weft strips to be under or over the surface finish warp strips.

In addition, it may be optional to insert surface finish strips vertically, longitudinally, laterally, or diagonally by alternating them and it may be optional to insert them in any sequence or in any proportion.

In this regard, surface finish strips of different sizes may be selected for fabrication in an alternate manner as required.

In addition, it is optional to use other materials, either natural materials such as materials from plants, materials from animals, or synthetic materials to alternate the designs as required by alternate insertion in any sequence as mentioned above, whereby the preferred material may be, for example, the wings of metallic wood-boring beetles.

The feature of the invention of producing a surface finish sheet without using a binder is obtained because the surface finish strips will bind and adhere to one another by the friction of each surface finish strip. With this feature, it is possible to remove the obtained surface finish sheet from a plate and attach the surface finish sheet to the surface of any article or implement required to be finished, whereby said fixing may be achieved without using any binder.

It is possible to use a surface finish sheet product obtained from the production process in finishing the surface of any articles or implements.

The invention claimed is:

1. A process for producing a surface finish sheet, comprising the steps of:

producing a plurality of surface finish strips each made from a natural material; and adhering the plurality of surface finish strips to each other using friction between the strips, the friction resulting at least in part from arranging the surface finish strips as weft strips disposed under and over warp strips.

2. A process for producing a surface finish sheet according to claim 1, wherein the natural materials are from at least one of plants and animals.

3. A process for producing a surface finish sheet according to claim 2, wherein the natural materials are selected from a group comprising *Lygodium flexuosum* vine, and bamboo.

4. A process for producing a surface finish sheet according to claim 2, wherein the natural materials are wings of metallic wood-boring beetles.

5. A process for producing a surface finish sheet according to claim 1, wherein at least one surface finish strip is produced by whittling the material down to a long, thin strip having a width of 0.5-5 mm.

6. A process for producing a surface finish sheet according to claim 5, wherein a metal sheet device is used in the whittling step, the device having a plurality of sized holes for downsizing the natural material gradually, the whittling step comprising passing the material through a first hole sized to whittle the material and then passing the material through a smaller hole sized to further whittle the material.

7. A process for producing a surface finish sheet according to claim 1, wherein said at least one surface finish strip has a width of not greater than 1 mm.

8. A process for producing a surface finish sheet according to claim 1, wherein the surface finish strip is dyed before or after a desired size is achieved.

9. A process for producing a surface finish sheet according to claim 1, further comprising the step of producing a surface finish sheet by arranging the surface finish strips in at least one of a longitudinal, lateral, and diagonal direction.

10. A process for producing a surface finish sheet according to claim 9, further comprising the step of arranging the surface finish strips to be adjacent to one another or interspaced.

11. A process for producing a surface finish sheet according to claim 9, further comprising the step of alternating the surface finishing strips in a pattern of transversal strips and longitudinal strips one by one.

12. A process for producing a surface finish sheet according to claim 1, further comprising the step of employing other materials in the alternating of designs.

13. A process for producing a surface finish sheet according to claim 12, wherein the other materials are the wings of metallic wood-boring beetles.

14. A process for producing a surface finish sheet, comprising the steps of:

producing a plurality of surface finish strips each made from a natural material; and adhering the plurality of surface finish strips to each other using friction between the strips without using a binding chemical, the friction resulting at least in part from arranging the surface finish strips as weft strips disposed under and over warp strips.

15. A process for producing a surface finish sheet, comprising the steps of:

producing a plurality of surface finish strips each made from a natural material comprising *Lygodium flexuosum* vine, and adhering the plurality of surface finish strips to each other using friction between the strips, the friction resulting at least in part from arranging some of the surface finish strips to be overlapping with others of the surface finish strips, wherein at least one surface finish strip is produced by whittling the material down to a long, thin strip having a width of 0.5-5 mm, and the at least one surface finish strip has a thickness of not greater than 1 mm.

16. A process for producing a surface finish sheet according to claim 15, further comprising the step of attaching the surface finish sheet to an article without using a binding chemical.

17. A process for producing a surface finish sheet according to claim 15, wherein a metal sheet device is used in the whittling, the device having a plurality of sized holes for downsizing the natural material gradually, the whittling comprising passing the material through a first hole sized to whittle the material and then passing the material through a smaller hole sized to further whittle the material.

* * * * *